United States Patent

[11] 3,542,318

| [72] | Inventor | Ralph G. Ellsworth, 185 Falstaff Road, Rochester, New York 14609 |
|---|---|---|
| [21] | Appl. No. | 758,273 |
| [22] | Filed | Sept. 9, 1968 |
| [45] | Patented | Nov. 24, 1970 |

[54] APPARATUS FOR ROTATING AIRCRAFT WHEELS PRIOR TO LANDING
2 Claims, 9 Drawing Figs.

| [52] | U.S. Cl. | 244/103 |
|---|---|---|
| [51] | Int. Cl. | B64c 25/40, |
| [50] | Field of Search | 244/103, 100,102 |

[56] References Cited
UNITED STATES PATENTS

| 2,298,523 | 10/1942 | Webster | 244/103 |
|---|---|---|---|
| 2,320,547 | 6/1943 | Tiger | 244/103 |
| 2,376,621 | 5/1945 | Reed | 244/103 |
| 2,399,218 | 4/1946 | Felburg | 244/103X |
| 2,408,163 | 9/1946 | Fodor | 244/103 |
| 2,417,937 | 3/1947 | Knox | 244/103 |
| 2,454,947 | 11/1948 | Schroeder | 244/103 |
| 2,481,600 | 9/1949 | Knox | 244/103UX |
| 2,521,864 | 9/1950 | Morse | 244/103X |
| 3,070,336 | 12/1962 | Lear | 244/103 |
| 3,096,052 | 7/1963 | Hardigan | 244/103 |

*Primary Examiner*—Trygve M. Blix
*Assistant Examiner*—Paul E. Sauberer
*Attorneys*—Philip K. Fitzsimmons, and B. Edward Shlesinger ABSTRACT: The wheels of a retractable landing gear are drivingly connected to the armatures of two motors, which are automatically energized, when the gear begins to lower just prior to the landing of the aircraft, and which are deenergized, as soon as the gear is fully lowered, and while the craft is still airborne. Warning lamps indicate when the gear is fully lowered; and speedometers connected to the wheels indicate the r.p.m. thereof. A rheostat in series with the motors is adjustable by the pilot to vary the power to the motors so that the r.p.m. of the wheels can be adjusted in relation to the air speed of the craft. The speedometers may be of the type which develop a voltage corresponding to the speed of the wheels; and means may be used to compare this voltage with that applied to the motors; and to deenergize the motors when the voltages are equal.

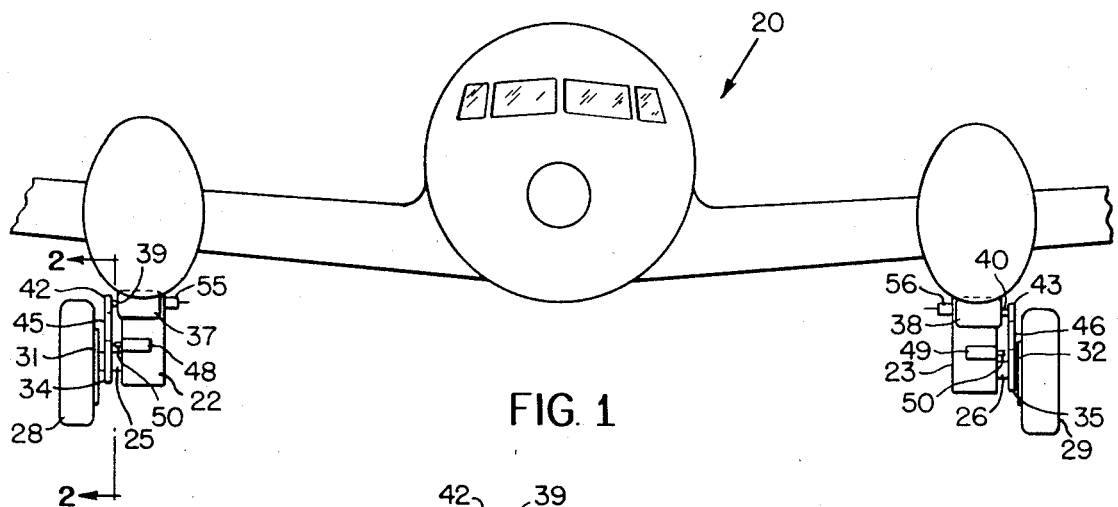
FIG. 1
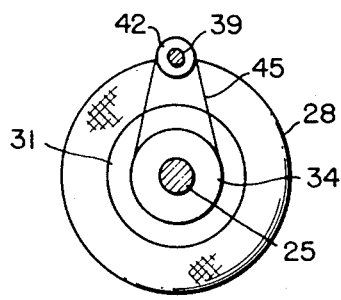
FIG. 2
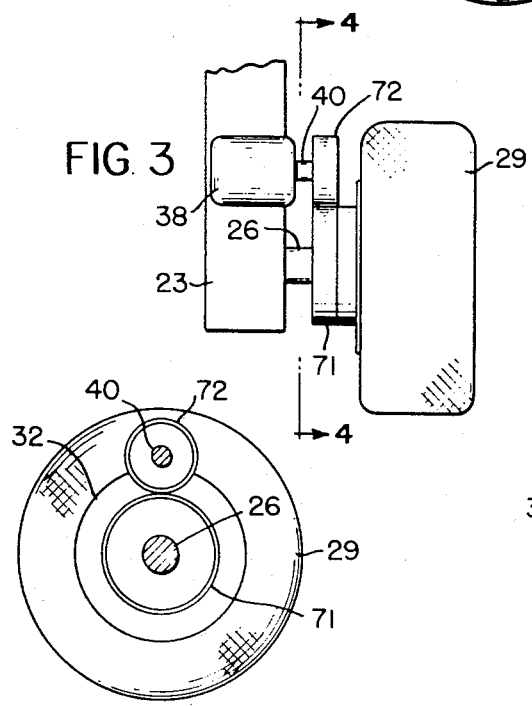
FIG. 3
FIG. 4
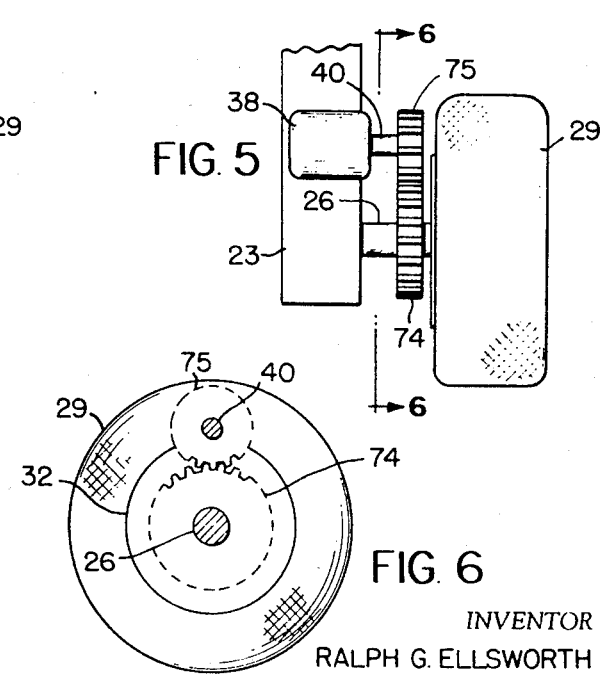
FIG. 5
FIG. 6
INVENTOR
RALPH G. ELLSWORTH
BY
ATTORNEYS

INVENTOR
RALPH G. ELLSWORTH

BY

ATTORNEYS 3,542,318

APPARATUS FOR ROTATING AIRCRAFT WHEELS PRIOR TO LANDING

This invention relates to aircraft landing gear apparatus, and more particularly to apparatus for positively rotating the landing wheels of an aircraft just prior to touch down.

Except for helicopters and certain varieties of seaplanes, most conventional aircraft landing gear apparatus comprises a plurality of wheels for bearing the weight of the aircraft during landing and takeoff. For smaller such aircraft, for example, a pair of spaced, relatively large landing wheels are located beneath the fuselage adjacent its center of gravity; and a further, smaller wheel is located beneath either the nose or tail of the plane. The two larger wheels, which may or may not be of the retractable-type, constitute the main landing wheels, and normally, for a properly executed landing, are the first to engage the ground. After the craft has landed and its ground speed has fallen below a predetermined value, the third or smaller wheel then touches down to complete the support of the aircraft upon at least three spaced points. For larger and more sophisticated aircraft, of course, the main landing gear wheels may be substantially greater in number.

Regardless of the particular size of the aircraft, or the number of main landing gear wheels which it employs, a problem common to all is the excessive wear to which these wheels are subjected upon each landing of the aircraft. Usually this undesirable wear occurs either because the wheels are not rotating at the time that they touch down, or because although rotating, they are not rotating at a speed comparable to that of the air speed of the aircraft. Consequently, to overcome the inertia of the wheels, a certain amount of skidding and consequent wear takes place when the aircraft lands, at least until the frictional forces caused by the skidding finally begin to rotate the wheels fast enough to compensate for the forward motion of the craft.

The obvious danger of this undesirable wear is that one or more of the pneumatic tires on the wheels may fail or explode during landing, thus resulting in damage to the plane or loss of life. This excessive wear also requires a rather large safety factor in most aircraft tires, so that they are not only expensive, but must be replaced often to minimize the risk of a crash during landing.

Heretofore efforts have been made to provide a device for rotating landing wheels of the type described immediately prior to the landing of an aircraft, but such devices, however, have been extremely expensive and have not proved to be entirely satisfactory.

It is an object of this invention, therefore, to provide an improved apparatus for eliminating the excessive wear on the main landing wheels of aircraft of the type described.

Another object of this invention is to provide novel apparatus for rotating the main landing wheels of an aircraft in advance of the touchdown of the aircraft during landing.

A more specific object of this invention is to provide for retractable aircraft landing wheels, a novel drive device for automatically and adjustably rotating the wheels during the lowering thereof just prior to the landing of the aircraft.

A still further object of this invention is to provide for aircraft landing wheels a novel drive device which will automatically be interrrupted, when the wheels reach a predetermined, adjustable r.p.m.

Other objects of the invention will be apparent hereinafter from the specification and from the recital of the appended claims, particularly when read in conjunction with the accompanying drawings.

In the drawings:

FIG. 1 is a fragmentary front elevational view of an aircraft, and apparatus made in accordance with one embodiment of this invention for rotating the main landing wheels of the aircraft prior to the landing thereof;

FIG. 2 is an enlarged sectional view taken along the line 2-2 in FIG. 1 looking in the direction of the arrows;

FIG. 3 is a fragmentary front elevational view of part of a modified form of this apparatus;

FIG. 4 is a sectional view taken along the line 4-4 in FIG. 3 looking in the direction of the arrows;

FIG. 5 is a fragmentary front elevational view of part of a still further modification of this apparatus;

FIG. 6 is a sectional view taken along the line 6-6 in FIG. 5 looking in the direction of the arrows;

Figure 7:
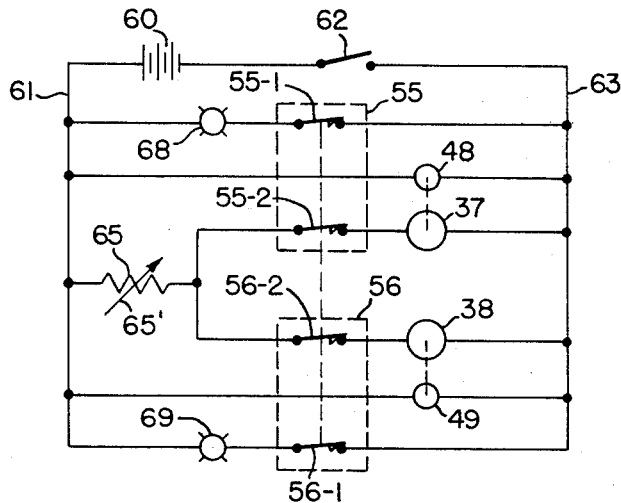
FIG. 7 is a wiring diagram illustrating one manner in which apparatus made according to this invention may be wired to control the rotation of the aircraft landing wheels.

Referring now to the drawings by numerals of reference, and first to FIGS. 1 and 2, 20 denotes part of a conventional aircraft, having a retractable landing gear comprising a pair of spaced struts 22 and 23, which are mounted in any conventional manner for retraction upwardly against the underside of the fuselage, when the aircraft is in flight, and for movement downwardly into operative positions as shown in FIG. 1, when the aircraft is on the ground, or is in the process of taking off or landing. Since any conventional mechanism may be employed for raising or lowering the struts 22 and 23, the details thereof have not been described herein.

Rotatably mounted in a conventional manner on a pair of shafts 25 and 26 that project from the struts 22 and 23, respectively, are two wheels, which in the usual manner support inflatable tires 28 and 29, respectively. Adjacent the insides of the tires 28 and 29 the wheels have fixed thereto, or integral therewith, circumferential brake drums 31 and 32, respectively. Adjacent drums 31 and 32 these wheels also have thereon annular pulleys 34 and 35, respectively. The tire 28, the brake drum 31 and the pulley 34 are rotatable in unison coaxially about the axis of shaft 25; and the tire 29, brake drum 32 and pulley 35 are likewise rotatable in unison coaxially about the axis of shaft 26.

Fixedly mounted on the struts 22 and 23 adjacent their associated shafts 25 and 26 are two electrical motors 37 and 38, respectively. The armatures or drive shafts 39 and 40 of these motors project outwardly toward the adjacent landing wheels, and parallel to the shafts 25 and 26, respectively. Secured on the outer ends of shafts 39 and 40 to rotate in spaced, coplanar relation with the associated pulleys 34 and 35, respectively, are two further drive pulleys 42 and 43, respectively. The pulley 42 is drivingly connected to the pulley 34 by a belt 45; and the pulley 43 is drivingly connected to its associated pulley 35 by a belt 46.

Mounted on the struts 22 and 23 beneath their associated motors 37, 38, are two electrical speedometers 48 and 49, respectively. These speedometers are identical; and each has a probe 50, which contacts part of the wheel supporting the adjacent tire 28 or 29 (or, for example, the inside face of the associated pulley 34 or 35, respectively, as illustrated in FIG. 1) to detect the speed at which the associated tire is rotating. Each of these speedometers 48 and 49 is conventional; and it may be, for example, of the type which develops an electrical signal or voltage, the magnitude of which is proportional to the rate at which the associated tire 28 or 29 is rotating. The output signals of the speedometers 48 and 49 may in turn be utilized in conventional fashion to actuate instruments such as r.p.m. indicators 48' and 49' (FIG. 9), which are mounted on a control panel P in the aircraft 20 to indicate the revolutions per minute at which tires 28 and 29, respectively, are rotating.

Figure 9:
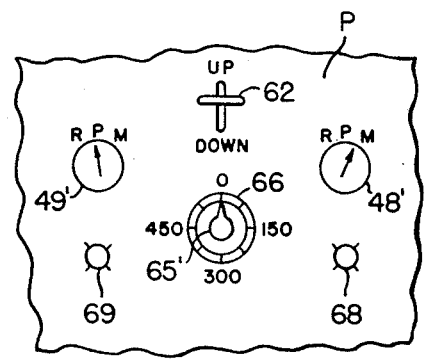
FIG. 9 is a fragmentary elevational view of a portion of the aircraft control panel, which may be used for mounting certain of the instruments that are used in connection with apparatus made in accordance with this invention.
Figure 8:
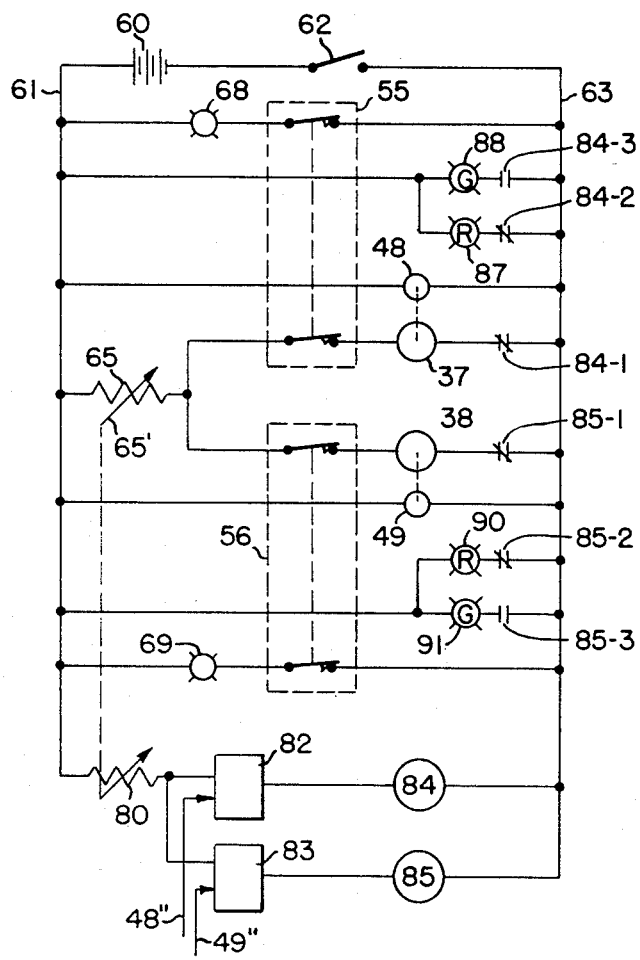
FIG. 8 is a wiring diagram illustrating a still different manner in which such apparatus may be wired.

Also mounted in convenient points on the aircraft 20 for operation during the raising and lowering of the struts 22 and 23, are two limit switches 55 and 56 (FIGS. 1, 7 and 8). Each of the switches 55 and 56 comprises two normally-closed contacts 55-1, 55-2 and 56-1, 56-2 respectively. Merely for purposes of illustration, switches 55 and 56 are illustrated schematically in FIG. 1 as being mounted on the struts 22 and 23, respectively, so that when the struts have reached their fully lowered or operative positions as shown in FIG. 1, properly located cams or detents (not illustrated) on the aircraft will cause the contacts of the switches 55 and 56 to be moved from their normally closed positions, as shown in FIGS. 7 and 8, to their open positions. Conversely, when the struts 22 and 23 are drawn upwardly out of their lowered or operative positions, the contacts of the switches 55 and 56 will return automatically to their normally-closed positions. 14 Referring now to the control circuit illustrated in FIG. 7, a power course source in the aircraft 20, such as for example its battery 60, is connected at one side to a line 61 and 90 its other side through a manually-operable switch 62 to a further line 63. The motors 37 and 38 are connected in parallel with one another, and in 82 with a variable rheostat or resistor 65 between the lines 61 and 63. the rheostat 65, which controls the power to the motors 37 and 38, is connected in a conventional manner to a knob 65', which is mounted on the aircraft control panel P (FIG. 9) for manual adjustment by the pilot as described in more detail below. The normally-closed contact 55-2 of the limit switch 55 is connected in series between the rheostat 65 and the motor 37; and the normally-closed contact 56-2 of the limit switch 56 is connected in series between the rheostat 65 and the motor 38, so that neither the motor 37 nor the motor 38 can be energized when its associated strut 22 or 23, respectively, has been lowered far enough to effect the opening of the associated switch contact 55-2 or 56-2, respectively. Also connected in parallel with one other between the lines 61 and 63, and in series with the switch contacts 55-1 and 56-1, respectively, are two warning lights 68 and 69 for indicating when the struts 22 and 23, respectively, have reached their lowered or operative positions. As shown in FIG. 9, these lamps 68 and 69 are mounted on the panel P for observation by the pilot.

Also mounted in parallel between the lines 61 and 63 are the two speedometers 48 and 49, which are adapted to be actuated upon the closing of the switch 62.

Switch 62 is the main control switch, and is mounted on the panel P (FIG. 9) for operation by the pilot. It normally is disposed in its uppermost position as shown in FIG. 9, when the aircraft is in flight. In this position switch 62 is open, so that the motors 37 and 38 are deenergized. This switch 62 also controls the apparatus (not illustrated) which operates to raise and lower the struts 22 and 23; and although in FIG. 1 the struts are shown to be in their lowered or operative positions, it is to be understood that when the switch 62 is open (up in FIG. 9), the struts 22 and 23 will be in their elevated or retracted positions (not illustrated).

In use, and assuming that the aircraft 20 is in flight, and that the switch 62 is open so that the landing gear apparatus is retracted, the switches will be in a position such as illustrated in FIG. 7; and the motors 37 and 38 will be deenergized because of the open circuit effected by switch 62. When the pilot is ready to land, the air speed of the aircraft 20 is observed, and the knob 65' on the panel P is rotated until its pointer registers with the indicium on the surrounding, calibrated dial 66 corresponding to the r.p.m. at which it is desired to rotate the tires 28 and 29. The greater the landing speed of the aircraft 20, the greater will be the speed at which its tires will have to be rotated to minimize or eliminate their skidding at touch down. This adjustment of the knob 65' effects a corresponding adjustment of the rheostat 65 either to increase or decrease, selectively, the magnitude of the voltage that will be applied from the battery 60 to the motors 37 and 38, when the switch 62 is closed.

After the knob 65' has been properly adjusted, the switch 62 is closed (pushed downwardly in FIG. 9) to initiate the lowering of the struts 22 and 23 by conventional apparatus (not illustrated), and simultaneously to energize the motors 37 and 38 through the now-closed contacts 55-2 and 56-2. Through their associated belt and pulley systems, these motors thus begin to drive the wheels upon which the tires 28 and 29 are mounted. As the pulleys 34 and 35 begin to rotate, the speedometers 48 and 49, which are now energized between the lines 61 and 63, begin to develop signals which cause the pointers on the r.p.m. indicators 48' and 49' to indicate the increasing speed of the now-rotating tires 28 and 29. Also at this time, the switch contact 55-1 and 56-1 are closed, so that the lamps 68 and 69 are illuminated to indicate to the pilot that the drive mechanism for the wheels is operating, and that the struts 22 and 23 have not as yet reached their lowermost or operative positions. The motors 37 and 38 are selected so that they will be capable of bringing the tires 28 and 29 rapidly up to the desired r.p.m. before the struts 22 and 23 reach their lowered, operative positions.

When the struts 22 and 23 are fully lowered, the switches 55 and 56 are actuated to open their associated contacts, thereby deenergizing the motors 37 and 38, and the lamps 68 and 69. The speedometers 48 and 49, however, continue to be energized as long as the switch 62 remains closed.

When the aircraft finally touches down, the tires 28 and 29 will thus be rotating fast enough to compensate for the forward airspeed of the aircraft 20; and hence the objectionable skidding and consequent burning or wear of the tires heretofore encountered will be eliminated. Moreover, since at this time the motors 37 and 38 are deenergized, they will not he damaged by any change in the speed of the tires resulting from the contact thereof with the ground.

FIGS. 3 to 6, wherein like numerals are employed to designate elements similar to those employed in the embodiment illustrated in FIGS. 1 and 2, illustrate two additional drive mechanisms, either of which may be substituted for the belt and pulley mechanisms illustrated in FIGS. 1 and 2. Since the type of drive will be identical for each of the landing wheels and their associated tires 28 and 29, respectively, only one wheel and its associated tire 29 is illustrated and described in connection with each of these two modified embodiments.

In the friction-type drive illustrated in FIGS. 3 and 4, a resilient drum or disc 71 is secured to the wheel upon which the tire 29 is mounted in place of the pulley 35 shown in FIG. 1. A second, smaller resilient drum or disc 72 is secured to the shaft 40 in lieu of the pulley 43 of FIG. 1 so that its periphery is in frictional, driving engagement with the periphery of the wheel 71. When the motor 38 is energized, the disc 72 will frictionally drive the disc 71, and consequently the wheel and its associated tire 29. In the embodiment shown in FIGS. 5 and 6, a spur gear 74 is secured to the wheel supporting the tire 29 in place of the pulley 35 shown in FIG. 1; and a pinion 75 is fixed to the shaft 40 to mesh with the gear 74, and to transmit the rotation of the shaft 40 to the gear 74, and hence to the tire 29, when the motor 38 is energized.

The modified control circuit illustrated in FIG. 8, wherein like numerals are employed to designate elements similar to those employed in the control circuit illustrated in FIG. 7, may be used when the landing gear is not the retractable type, or whenever it is desired to prevent the tires 28 and 29 from being rotated at an excessive speed during the landing of the aircraft 20. In this embodiment a second variable resistor 80, which is adjustable simultaneously with the resistor 65 by the knob 65', is connected to one of the inputs of each of two conventional voltage comparators 82 and 83. The output signal of the speedometer 48, which is the same signal that operates the pointer for the indicator 48', is applied through a line 48'' to the other input or the comparator 82. Also, the output signal of the speedometer 49 is applied through a line 49'' to the other input of the comparator 83. The outputs of the comparators 82 and 83 are connected through relay coils 84 and 85, respectively, to ground, or to line 63. Coils 84 and 85 control the associated relay switches 84-1, 84-2, 84-3, and 85-1, 85-2 and 85-3, respectively, as noted below.

In operation, neither comparator has an output signal unless its two associated input signals are equal; and consequently the relay coils 84 and 85 normally are deenergized. However, when either of the tires 28 or 29 reaches a desired speed during operation of the motors 37 and 38, that is, for example, whenever the pointer on the indicator 48' or 49' indicates that the associated tire 28 or 29 is rotating at an r.p.m. equal to that for which the knob 65' has been set, the input signal from the associated speedometer 48 or 49 to the line 48'' or 49'', respectively, will equal the other input signal from the rheostat 80 to the comparator 82 or 83, respectively. This will cause either the relay coil 84 or 85, or both if both tires 28 and 29 are rotating at the desired r.p.m. to become energized. When the coil is energized it opens the normally-closed switch 84-1 in series with the motor 37 to deenergize the latter; and it also opens normally-closed switch 84-2, which normally energizes a red warning lamp 87 between the lines 61 and 63, and it closes a further pair of normally-open contacts 84-3, which then operate to energize a green lamp 88, between the lines 61 and 63. When lamp 87 is illuminated, it indicates that the tire 28 has not reached the desired r.p.m. for which the knob 65' has been set; but when it is deenergized and the lamp 88 is energized, the latter indicates that this speed has been attained, and that the motor 37 has been deenergized.

Similarly, when the coil 85 is energized, it opens a normally-closed switch 85-1, in series with the motor 38, so that the latter becomes deenergized. At this time the coil 85 also opens a normally-closed switch 85-2, and closes a normally-open switch 85-3, which control red and green warning lamps 90 and 91, respectively, that indicate, in a manner similar to the lamps 87 and 88 for tire 28, whether or not tire 29 has reached the desired r.p.m. for which the knob 65' has been set. These red and green warning lamps would, of course, be mounted on the panel P of the aircraft to be viewable by the pilot.

If the control circuit of FIG. 8 is used for operating the motors 37 and 38 to drive the wheels of a fixed, or nonretractable landing gear, the switches 55 and 56 would of course, not be employed.

From the foregoing it will be apparent that applicant has developed relatively simple and reliable apparatus for minimizing or obviating the excessive wear on aircraft landing wheel tires heretofore encountered during the touch down of the aircraft upon landing. The novel apparatus disclosed herein not only provides for positively driving the aircraft landing wheels just prior to touch down; but also it permits the adjustment of the speed at which these wheels can be driven to correlate the wheel speed with the air speed of the craft. Also, in the case of a retractable landing gear, the driving mechanism for the aircraft landing wheels is automatically deenergized as soon as the landing gear has been completely lowered to its operative position, thus preventing damage which might otherwise result, if the mechanism were operating upon the touch down of the associated aircraft. Also, by making the landing wheel driving apparatus responsive to a feedback signal from the speedometers, that are operated by the wheels, it it possible to interrupt the drive to the wheels as soon as they attain a predetermined r.p.m., thus preventing the wheels from being rotated excessively fast prior to landing.

While the invention has been described in connection with several specific embodiments thereof, it will be understood that it is capable of still further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:

1. Apparatus for rotating the landing wheels of an aircraft prior to the touch down of the aircraft during landing, comprising:
   drive means connected to the landing wheels of the aircraft and actuatable to rotate said wheels;
   means for actuating said drive means when the aircraft is airborne,
   means for adjusting said drive means to rotate each of said wheels at a predetermined, adjustable speed;
   means for automatically deactuating said drive means, when said wheels reach said predetermined speed;
   said deactuating means comprising means for detecting the speed at which said wheels are rotated by said driving means,
   means responsive to said detecting means and said adjusting means for interrupting said drive means when the speed detected by said detecting means equals said predetermined speed;
   said drive means comprising at least one electrical motor for driving said wheels;
   said adjusting means comprising a variable resistance connected in circuit with said motor and manually adjustable to vary the operating voltage applied to said motor;
   said detecting means comprising means for developing a voltage corresponding in magnitude to the speed at which said wheels rotate; and
   said means responsive to said detecting means and said adjusting means comprising means for comparing said voltages and operative to interrupt the circuit to said motor, when said voltages are equal.

2. Apparatus for rotating the landing wheels of an aircraft of the type in which the wheels are movable between retracted and lowered positions, respectively, comprising:
   drive means connected to the landing wheels of the aircraft;
   means for automatically actuating said drive means during the movement of said wheels from their retracted to their lowered positions;
   means for adjusting said drive means to rotate said wheels at a predetermined, adjustable speed;
   means responsive to positions movement of said wheels between their retracted and lowered positions for automatically deactuating said drive means when said wheels have reached their lowered positions;
   said drive means comprising at least one electrical motor for driving said wheels;
   said deactuating means comprising a normally-closed switch in circuit with said motor and movable automatically to an open position to deenergize said motor, when said wheels reach their fully lowered positions;
   said adjusting means comprising a variable resistance connected in series with said switch and said motor, and manually operable from within the aircraft to vary the operating voltage applied to said motor;
   electrical means operatively connected to said wheels to develop a voltage corresponding in magnitude to the speed at which said wheels rotate;
   means for comparing the magnitude of the last-named voltage with the magnitude of said operating voltage; and
   a further, normally-closed switch connected in series with said motor; and
   means responsive to said comparing means to open said further switch, when said voltages are equal.